United States Patent

Förster et al.

[11] Patent Number: 5,279,183
[45] Date of Patent: Jan. 18, 1994

[54] COMBINATION OF A CRANKSHAFT AND A FLYWHEEL

[75] Inventors: Andreas Förster, Schweinfurt; Peter Weber, Alfdorf/Pfahlbronn; Bernhard Schierling, Kürnach; Dieter Kolb, Bad Kissingen; Harald Jeppe, Schweinfurt; Hilmar Goebel, Grafenrheinfeld, all of Fed. Rep. of Germany

[73] Assignee: Fichtel & Sachs AG, Schweinfurt, Fed. Rep. of Germany

[21] Appl. No.: 688,163

[22] Filed: Apr. 19, 1991

[30] Foreign Application Priority Data

Apr. 26, 1990 [DE] Fed. Rep. of Germany ....... 4013298

[51] Int. Cl.$^5$ ............................................. F16D 13/60
[52] U.S. Cl. ............................................. 74/572
[58] Field of Search ............... 74/572, 573 R; 403/262, 403/263, 264, 1, 13, 14, 258, 260, 337, 354; 29/464, 466

[56] References Cited

U.S. PATENT DOCUMENTS

| 2,943,503 | 7/1960 | Förster | 74/572 X |
| 3,430,461 | 3/1969 | Boylan | 403/262 X |
| 3,635,320 | 1/1972 | Capanna | 74/572 X |
| 4,346,624 | 8/1982 | Nagasaki et al. | 74/572 X |
| 4,593,798 | 6/1986 | Yew | 74/572 X |
| 4,791,829 | 12/1988 | Fukushima et al. | 74/572 X |
| 4,889,011 | 12/1989 | Steahly | 74/572 X |

FOREIGN PATENT DOCUMENTS

| 3315232 | 11/1983 | Fed. Rep. of Germany . | |
| 61-233241 | 10/1986 | Japan | 74/572 |
| 0395497 | 7/1933 | United Kingdom . | |
| 0685426 | 1/1973 | United Kingdom . | |
| 1365657 | 9/1974 | United Kingdom . | |

Primary Examiner—Leslie A. Braun
Assistant Examiner—Ryan W. Massey
Attorney, Agent, or Firm—Brumbaugh, Graves, Donohue & Raymond

[57] ABSTRACT

According to an illustrative example of the invention, a flywheel is screwed to a crankshaft by a central bolt. The flywheel and the crankshaft are further provided with radially extending teeth in opposite annular contact faces. These teeth are engaged such as to center the flywheel with respect to the crankshaft and to permit torque transmission between the crankshaft and the flywheel. An angular positioning pin of the flywheel engages into a pin receiving bore of the crankshaft.

31 Claims, 3 Drawing Sheets

COMBINATION OF A CRANKSHAFT AND A FLYWHEEL

BACKGROUND OF THE INVENTION

This invention relates to a combination of a crankshaft and a flywheel. Such combinations are used for internal combustion engines of motor-vehicles. The crankshaft and the flywheel are manufactured separately and must be fastened to each other during the assembly of the combustion engine with a clutch and a gear box. It is highly desirable to provide a crankshaft unit and a flywheel unit which can be easily fastened to each other. This is particularly true in cases in which the flywheel is preassembled with a clutch unit, i.e. a unit comprising a clutch housing fastened to the flywheel, a clutch disc to be connected with a gear box input shaft, a pressure plate connected to the clutch housing for common rotation and axial movement with respect to each other and intended to press the clutch disc against the flywheel, a spring unit acting onto a pressure plate and possibly clutch release means acting onto the pressure plate or the spring unit.

STATEMENT OF THE PRIOR ART

Such a combination of a crankshaft and a flywheel is known from German Publication 33 15 232 A1. In this known combination, the flywheel and the crankshaft have respective alignable axes and substantially axially directed, mutually opposite, annular contact faces about the respective axis. The flywheel can be fastened to the crankshaft by a screw means, which has a screwing axis coincident with the axes of said crankshaft and said flywheel. The contact faces are according to this known combination in frictional engagement. This frictional engagement is responsible for the torque transmission between the crankshaft and the flywheel.

It is necessary to provide high frictional forces and, therefore, it is necessary to generate a large axial force by the screw means for maintaining the contact faces in frictional engagement. This complicates the assembling of the crankshaft and the flywheel, particularly when the flywheel is preassembled with a clutch unit as defined above.

OBJECT OF THE INVENTION

It is a main object of the present invention to provide a combination of a crankshaft and a flywheel, which allows an easy connection between the crankshaft and the flywheel and further permits high torques to be transmitted without the risk of slip between the crankshaft and the flywheel.

A further object of the present invention is to provide each of the two units, crankshaft unit and flywheel unit, in a preassembled status so that all parts necessary for combining the two units are already present at the respective unit, when assembling begins and cannot be lost before assembling is terminated.

SUMMARY OF THE INVENTION

In consideration of the above objects and at least the above-mentioned primary object, a flywheel and a crankshaft having respective alignable axes and substantially axially directed mutually opposite annular contact faces about each respective axis are provided. The flywheel can be attached to the crankshaft by screw means. The screw means has a screwing axis coincident with the axes of the crankshaft and the flywheel. The contact faces of the crankshaft and the flywheel are provided with respective teeth means engageable with each other by an axial force resulting from the screw means. The teeth means are adapted to center the crankshaft and the flywheel in radial direction and to allow transmission of torques about the axes between the crankshaft and the flywheel. The teeth means which simultaneously fulfill a radial securing function and a torque transmission function may be shaped as radially extending teeth, the head and root edges of which coincide with respective radii. Preferably, these teeth have, when regarded in a radial direction, a triangular profile with a larger triangle at the radially outer end of the respect tooth and a smaller triangle at the respect radially inner end of a tooth. Such teeth means are generally designated as so-called "Hirth-shaped teeth means".

Frequently, it is necessary to have a well defined angular position of the flywheel with respect to the crankshaft, particularly in cases in which an angular position sensor is provided on the flywheel, and the angular position of this angular position sensor must be in a predetermined angular relationship with respect to the cranks of the crankshaft. For such cases, the crankshaft and the flywheel may further comprise angular positioning means for establishing a single predetermined possible angular orientation of the crankshaft and the flywheel about their respective axes, when the crankshaft and the flywheel are assembled.

These angular positioning means may comprise a positioning pin member on one of said crankshaft and said flywheel and positioning pin receiving means on the other one of said crankshaft and said flywheel. It is desirable that a certain positioning play exists between the pin member and the pin receiving means so that the centering function of the teeth means is not influenced by the engagement of the pin member and the positioning pin receiving means. This play must be in such relationship with respect to the pitch of the teeth means that, on the one hand, the teeth means can always be brought into engagement without simultaneous positive engagement of the positioning pin member and the positioning pin receiving means. On the other hand, the relationship between the pitch of the teeth means and the play of the angular positioning means must be such that predetermined teeth of the crankshaft always engage between predetermined teeth of the flywheel.

The positioning pin receiving means may comprise a positioning bore.

The angular positioning means may be located radially inwards of the annular contact faces.

According to a first embodiment of the invention, the flywheel may have a central portion radially inwards of the respective contact face, said central portion being receivable by a central recess of said crankshaft radially inwards of the respective contact face.

This central portion may have a cylindrical bore or cavity for receiving at least part of the screw means.

The central portion may have a radial play with respect to said recess. This radial play prevents a double fit between the teeth means on the one hand and the combination of recess and central portion on the other hand. The engagement of the central portion and the recess should, however, be such that it assists the angular positioning by the angular positioning means.

More particularly, with said first embodiment, the screw means may comprise an externally threaded bolt member having a head portion. This bolt member may be screwable into the internally threaded bore of the crankshaft after having passed through a central bottom opening of the bottom wall of the central portion. The head portion is then located inside the bore of the central portion and adapted for acting onto a substantially axially directed internal bottom face of said bottom wall of said central portion.

A pilot bearing for rotatably mounting an end portion of a gear box input shaft may be insertable within the pot-shaped central portion at a location more remote from said bottom wall than said head portion.

In consideration of the aim of easy assembling, the flywheel may be preassembled with the bolt member and the pilot bearing. This preassembly may be obtained e.g. in that the pilot bearing has a central passage with an internal diameter smaller than the external diameter of the head portion of the bolt member. In this case, it is only necessary to fasten the pilot bearing within the pot-shaped central portion. The bolt member is then bound to the flywheel such that it cannot be lost. On the other hand, the screwing movement to be applied to the bolt member is not inhibited.

According to a further embodiment of the invention, the screw means comprise a screw member having an externally threaded hub portion screwable into an internally threaded bore of said crankshaft and a substantially radially extending engagement flange engageable with a substantially axially directed engagement face of said flywheel, said engagement face being located on said flywheel at a side thereof, remote from the respective contact face.

For accommodating a pilot bearing and for providing torque application faces at the screw member, it is desirable to shape the hub portion as a tubular hub portion along at least part of its axial length.

The pilot bearing may be preassembled with said screw member.

The screw member may be preassembled with the flywheel, such as to permit rotation of said screw member with respect to said flywheel. The preassembly of the screw member with the flywheel may be performed by at least one radially extending securing strip secured to said flywheel radially outwards of the engagement flange and engaging a holding face of said engagement flange remote from the engagement face of said flywheel. This securing strip may be an annular securing strip having an axis coincident with the axis of said flywheel.

For avoiding a double fit, it is desirable that the engagement flange has a radial play with respect to said engagement face of said flywheel.

In both embodiments, the flywheel-side teeth means may be provided on an annular teeth means carrier manufactured separately from said flywheel and preassembled with said flywheel. This facilitates the manufacturing of the flywheel. It is needless to say that the teeth means of the crankshaft may also be provided on a separate member to be fastened to the crankshaft.

The invention also relates to the individual units, namely crankshaft unit and flywheel unit, which define together the above discussed combinations. By a crankshaft unit we mean the crankshaft, including at least all crankshaft-side components necessary for combination with the flywheel. By flywheel unit we mean the flywheel, including at least all flywheel-side components necessary for fastening the flywheel to the crankshaft. In certain cases, the flywheel unit may also include a so-called clutch unit or clutch module as defined above.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to embodiments shown in the accompanying drawings in which.

DETAILED DESCRIPTION OF THE PREFERRED EMBODIMENTS

Figure 1:
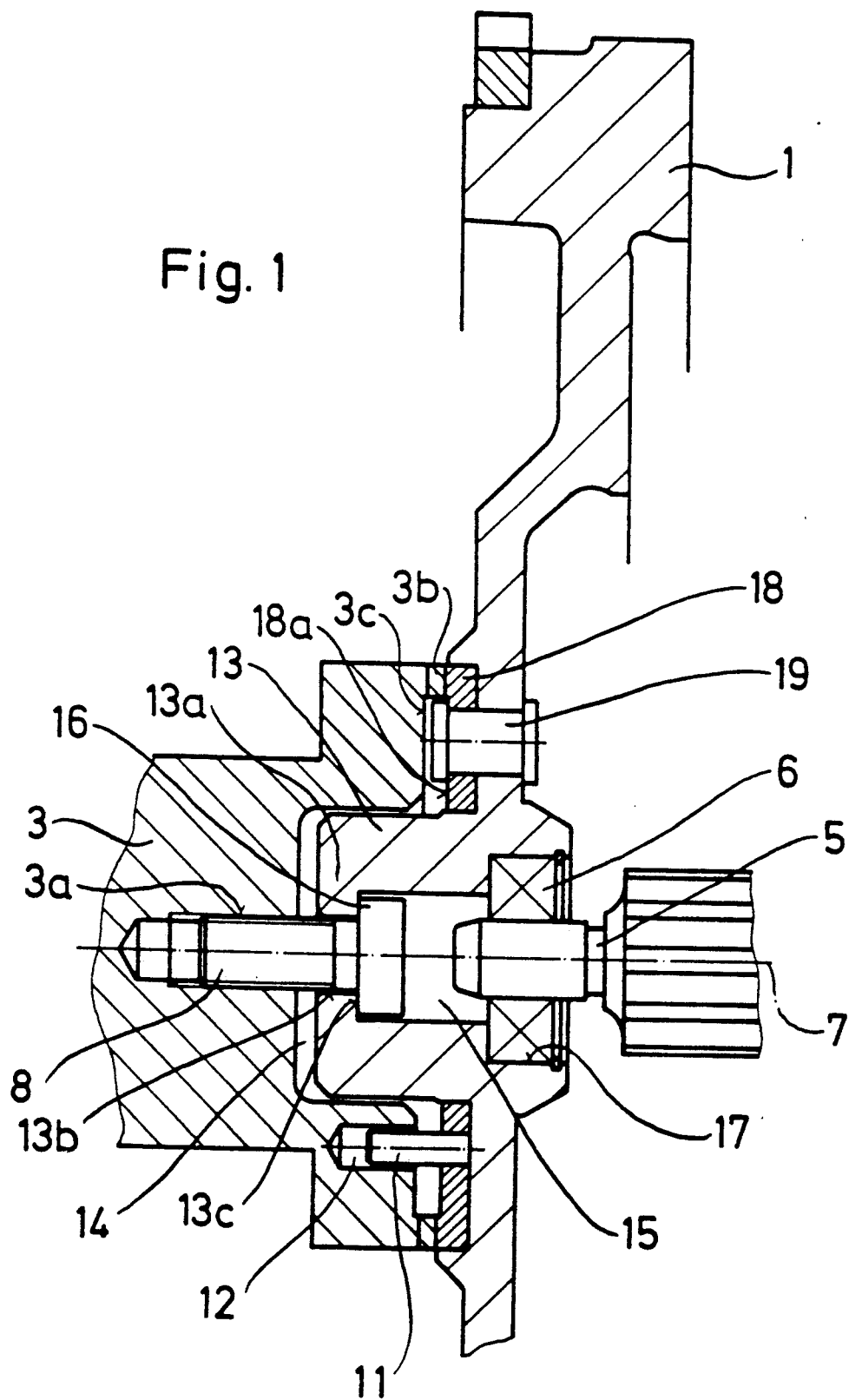
FIG. 1 shows a partial longitudinal section through a flywheel with a crankshaft end and a portion of the gearbox input shaft.
Figure 3:
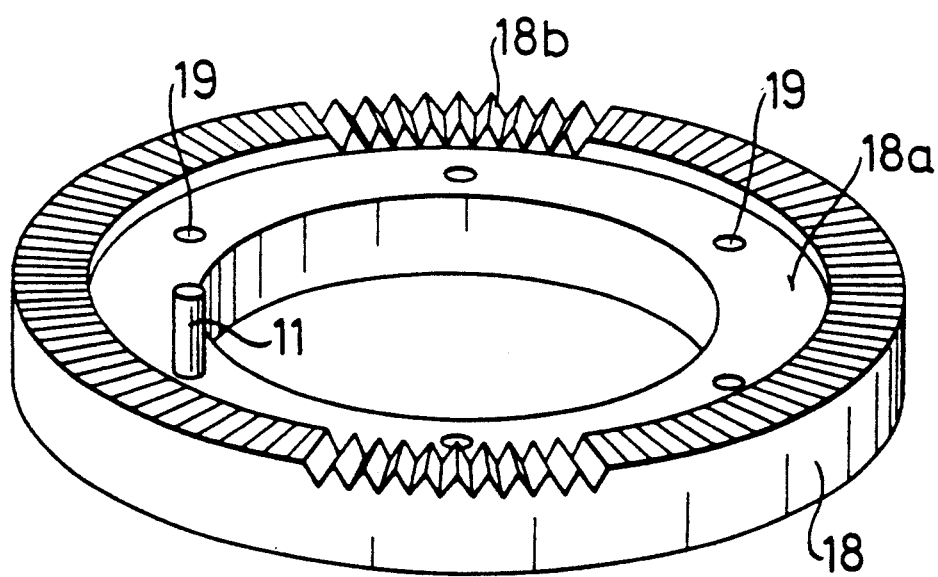
FIG. 3 shows a teeth carrier, particularly for the embodiment of FIG. 1.

FIG. 1 shows a partial longitudinal section through a flywheel 1 screwed onto a crankshaft 3. The flywheel 1 is provided in one piece with a central portion 13 which projects toward the internal combustion engine into a corresponding recess 14 in the crankshaft 3. The central portion 13 has a cylindrical cavity 15. A fastening bolt 8 penetrates through a bottom wall opening 13b of a bottom wall 13a and engages an internally threaded bore 3a of the crankshaft 3. The head portion 16 of the bolt 8 engages an inner bottom wall surface 13c of the bottom wall 13a. The flywheel 1 is provided, adjacent to the central portion 13 on the side facing the crankshaft 3, with a teeth carrier 18 rigidly mounted on the flywheel 1 via rivets 19. This teeth carrier 18 has, radially outside the rivets 19 concentrically to the axis of rotation 7, an annular face 18a with teeth 18b (see FIG. 3). The teeth 18b are engaged with teeth 3b provided on an annular contact face 3c of the crankshaft 3. The teeth 18b and 3b are preferably constructed as so-called serrations. The tip and root edges of the teeth 18b and 3b run in radial direction, as can be seen from FIG. 3. So configured, the teeth 18b and 3b can fulfill a radial centering function. The type of teeth used at 18b and 3b is also called a Hirth-type serration. The triangular shape of the teeth 18b and 3b permits torque transmission when the teeth 18b and 3b are pressed into mutual engagement by the bolt 8. The use of a separate carrier 18 for providing the teeth 18b serves the aim of simplifying the production of teeth. On radially inside zones of the annular contact faces 18a and 3c there are provided angular position means, namely a pin member 11 on the carrier 18 and a bore 12 in the crankshaft 3. These angular positioning means 11,12 serve to correctly coordinate the crankshaft 3 and the flywheel 1 in angular direction. This is necessary e.g., if one or more pulse generators or parts thereof are provided on the flywheel for sensing the respective angular position of the crankshaft. The cavity 15 is provided with an annular recess 17, into which a pilot bearing 6 is inserted. The pilot bearing 6 is axially held e.g. by a circlip. By making the internal diameter of the pilot bearing 6 smaller than the external diameter of the screw head 16 the fastening screw 8 forms a unit with the flywheel prior to assembly of the flywheel 1 on the crankshaft 3 and cannot be lost.

The described construction produces a connection between flywheel and crankshaft which is easy to produce, can be opened at any time and can be closed again at the correct angle and, in particular with regard to modular clutches, allows simple assembly.

Figure 2:
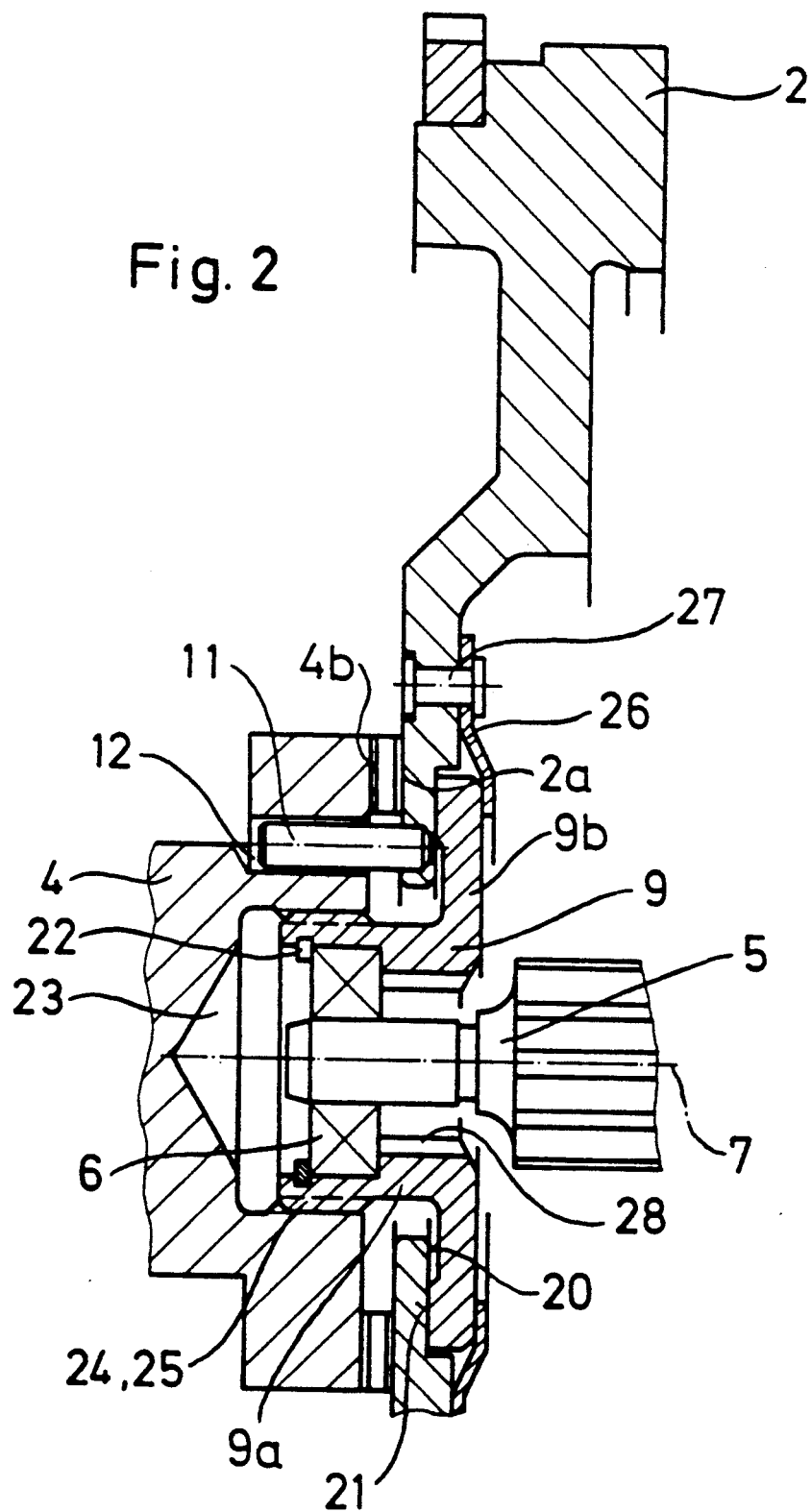
FIG. 2 shows a partial longitudinal section through a variation of FIG. 1.

The variation illustrated in FIG. 2 shows a flywheel 2 which is provided in one piece with the flywheel-side set of teeth 2a. The crankshaft 4 has teeth 4b as in FIG. 1. The angular positioning device also consists of the parts 11 and 12 as in FIG. 1. The screw connection is produced in this construction by a screw member 9 having a hub portion 9a and an engagement flange 9b. The hub portion 9a is provided with external thread means 24 screwed into internal thread means 25 of the bore 23 provided in the crankshaft 4. The engagement flange 9b engages an engagement face 20 by a counter-engagement face 21. Both faces 20 and 21 are substantially orthogonal with respect to the axis 7. The engagement of faces 20 and 21 overlaps with the teeth 2a and 4b. The screw member 9 is preassembled with the flywheel by an annular strip material 26, which is riveted radially outside the teeth 2a and 4b to the flywheel 2 by rivets 27. In the tubular hub portion 9a there is provided a pilot bearing 6, which serves to guide the gear box input shaft 5. The pilot bearing 6 is preassembled with the screw member 9 by a slit elastic ring 22. The screw member 9 is provided with key surfaces 28, which allow the screw member 9 to be screwed into the bore 23. Before the gear box input shaft 5 is inserted into the hub portion 9a, the screw member 9 can be fastened with respect to the crankshaft 4 by a tool engaging the key faces 28. The flywheel 2 may be connected with a clutch unit or clutch module as defined above. Thus, the total flywheel unit including the clutch unit may be preassembled including the screw member 9b, the pilot bearing 6 and the positioning pin 11. This preassembled unit may then be fastened to the crankshaft 4 by rotation of the screw member 9.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A combination of a crankshaft and a flywheel for use in connection with an internal combustion engine, said combination comprising:

a flywheel and a crankshaft having aligned axes of rotation and axially mutually opposite flywheel-side teeth means and crankshaft-side teeth means, respectively, in annular arrangement about respective axes for positioning said flywheel and said crankshaft with respect to each other in one of a plurality of torque-transmitting relative angular orientations offered by said teeth means;

angular positioning means carried in part by said flywheel and in part by said crankshaft, said angular positioning means restricting said plurality of torque-transmitting orientations and allowing, when engaged with each other, a positioning play between said crankshaft and said flywheel along a plane perpendicular to said axes with respect to a selected angular orientation allowed by said engaged angular positioning means, said positioning play being small enough such that the respective teeth of said flywheel-side teeth means and said crankshaft-side teeth means can engage each other only in a particular tooth-for-tooth alignment corresponding to said selected angular orientation, said positioning play also being large enough such that said angular positioning means does not interfere with the positioning function of said respective teeth means in said selected angular orientation;

said angular positioning means and said flywheel-side and crankshaft-side teeth means being shaped such that in response to an axial relative assembling approach of said flywheel and said crankshaft engagement of said angular positioning means occurs in advance of engagement of said flywheel-side teeth means and said crankshaft-side teeth means; and screwing means for forcing said crankshaft-side teeth means and said flywheel-side teeth means axially together in said selected angular orientation such that said flywheel-side teeth means and crankshaft-side teeth means engage each other in said tooth-for-tooth alignment corresponding to said selected angular orientation.

2. A combination of a crankshaft and a flywheel according to claim 1 wherein said angular positioning means comprises a positioning pin member on one of said crankshaft and said flywheel and means for receiving said pin member on the other of said crankshaft and said flywheel.

3. A combination of a crankshaft and a flywheel according to claim 2 wherein said receiving means comprises a bore.

4. A combination of a crankshaft and a flywheel according to claim 1 wherein said angular positioning means is located radially inward of said teeth means.

5. A combination of a crankshaft and a flywheel according to claim 1 wherein said flywheel has a central portion which extends into a central recess of said crankshaft, said central portion and central recess being located radially inward of said respective teeth means.

6. A combination of a crankshaft and a flywheel according to claim 5 wherein there is radial play between said central portion and said central recess.

7. A combination of a crankshaft and a flywheel according to claim 5 wherein said central portion has a generally cylindrical cavity.

8. A combination of a crankshaft and a flywheel according to claim 7 wherein said cavity of said central portion contains at least a portion of said screw means.

9. A combination of a crankshaft and a flywheel according to claim 8 wherein said central portion has a bottom wall adjacent said crankshaft, an opening extends axially through said bottom wall and communicates with said generally cylindrical cavity, and wherein said screw means comprises a bolt having a head portion located in said generally cylindrical cavity and an externally threaded shank portion extending through said bottom wall opening and said head being larger than said bottom wall opening, such that said head acts on a substantially axially directed bottom face of said bottom wall, and wherein said crankshaft is formed with an internally threaded bore means for screwably receiving said bolt shank portion.

10. A combination of a crankshaft and a flywheel according to claim 9 wherein said central portion has a second opening which opens into said generally cylindrical cavity at the opposite end thereof from said bottom wall, said combination further comprising a pilot bearing means adapted for rotatably mounting an end portion of a gear box input shaft, said pilot bearing means being mounted within said second opening at a location more remote from said bottom wall than said bolt head portion and being sized such that said bolt head portion is held within said generally cylindrical cavity.

11. A combination of a crankshaft and a flywheel according to claim 10 further comprising means for holding said pilot bearing means in said mounted location.

12. A combination of a crankshaft and a flywheel according to claim 11 wherein said pilot bearing means defines a central passage with an internal diameter smaller than the external diameter of said bolt head portion.

13. A combination of a crankshaft and a flywheel according to claim 1 wherein said screw means comprises a screwing member having an externally threaded hub portion screwed into an externally threaded bore of said crankshaft and a substantially radially extending engagement flange means for engaging a substantially axially directed engagement face of said flywheel, said engagement face being located on said flywheel at a side thereof remote from the flywheel-side teeth means face.

14. A combination of a crankshaft and a flywheel according to claim 13 wherein said hub portion is tubular.

15. A combination of a crankshaft and a flywheel according to claim 14 wherein said tubular hub portion accommodates a pilot bearing means, said pilot bearing means being adapted for rotatably mounting an input shaft of a gear box.

16. A combination of a crankshaft and a flywheel according to claim 15 further comprising means for fastening said pilot bearing means to said screw member.

17. A combination of a crankshaft and a flywheel according to claim 16 further comprising holding means for holding said screw member and said flywheel together while permitting said flywheel and screw member to rotate relative to one another about said flywheel axis.

18. A combination of a crankshaft and a flywheel according to claim 17 wherein said holding means comprises at least one radially extending securing strip secured to said flywheel radially outwards of said engagement flange, said securing strip engaging a holding face of said engagement flange remote from said engagement face of said flywheel.

19. A combination of a crankshaft and a flywheel according to claim 18 wherein said securing strip is an annular securing strip which has an axis coincident with the axis of said flywheel.

20. A combination of a crankshaft and a flywheel according to claim 13 wherein said engagement flange has radial play with respect to said engagement face of said flywheel.

21. A combination of a crankshaft and a flywheel according to claim 1 wherein at least one of said respective teeth means is provided on an annular teeth means carrier which is attached to one of said flywheel and said crankshaft.

22. A combination of a crankshaft and a flywheel according to claim 1 wherein said respective teeth means have teeth which have tip and root edges which extend in the radial direction.

23. A combination of a crankshaft and a flywheel according to claim 1 further comprising means for attaching a clutch to the flywheel.

24. A combination as set forth in claim 1, wherein said screw means is aligned with said axis.

25. A combination as set forth in claim 1, wherein said flywheel-side teeth means and said crankshaft-side teeth means are provided substantially axially directed, mutually opposite annular faces of said flywheel and said crankshaft, respectively.

26. A crankshaft for use with a flywheel in connection with an internal combustion engine, said crankshaft having an axis and comprising:
crankshaft-side teeth in annular arrangement about said axis for engagement with axially opposite flywheel-side teeth of a flywheel in a plurality of torque-transmitting angular orientations of said crankshaft with respect to a flywheel; and
angular positioning means for coacting with cooperating means on the flywheel for restricting said plurality of angular orientations prior to engagement of the crankshaft-side teeth with the flywheel side teeth.

27. A crankshaft according to claim 26, wherein said angular positioning means—when engaged with said cooperating means on the flywheel—allows for a positioning play between said crankshaft and the flywheel combined therewith in a plane perpendicular to said axis, said positioning play being small enough such that the crankshaft-side teeth can only engage the teeth of the flywheel in one particular predetermined tooth-for-tooth alignment corresponding to a selected angular orientation allowed by said angular positioning means, said positioning play also being large enough such that the positioning means does not interface with the torque-transmitting function of said crankshaft-side teeth and said flywheel-side teeth.

28. A crankshaft according to claim 27, further comprising means aligned with said axis for coacting with cooperating means on the flywheel for forcing said crankshaft axially together with the flywheel.

29. A flywheel for use with a crankshaft in connection with an internal combustion engine, said flywheel having an axis and comprising:
flywheel-side teeth in annular arrangement about said axis for engagement with axially opposite crankshaft-side teeth of a crankshaft in a plurality of torque-transmitting angular orientations of said flywheel with respect to a crankshaft; and
angular positioning means for coacting with cooperating means on the crankshaft for restricting said plurality of angular orientations prior to engagement of the flywheel-side teeth with the crankshaft-side teeth.

30. A flywheel according to claim 29, wherein said angular positioning means—when engaged with said cooperating means on a crankshaft—allows for a positioning play between said flywheel and a crankshaft combined therewith in a plane perpendicular to said axis, said positioning play being small enough such that the flywheel-side teeth can only engage the teeth of the flywheel in one particular predetermined tooth-for-tooth alignment corresponding to a selected angular orientation allowed by said angular positioning means, said positioning play also being large enough such that the positioning means does not interfere with the torque-transmitting function of said flywheel-side teeth and said crankshaft-side teeth.

31. A flywheel according to claim 30, further comprising means aligned with said axis for coacting with cooperating means on the crankshaft for forcing said flywheel axially together with the crankshaft.

* * * * *

UNITED STATES PATENT AND TRADEMARK OFFICE
CERTIFICATE OF CORRECTION

PATENT NO. : 5,279,183
DATED : January 18, 1994
INVENTOR(S) : Förster et al.

It is certified that error appears in the above-indentified patent and that said Letters Patent is hereby corrected as shown below:

<u>Col. 2, line 14</u>, delete the words "respect" at the beginning and end of line;
<u>Col. 3, line 19</u>, delete "pot-shaped";
<u>Col. 7, line 30</u>, delete "face";
<u>Col. 8, line 9</u>, "axis" should read --axes--;
<u>Col. 8, line 12</u>, after "provided" insert --on--;
<u>Col. 8, line 39</u>, "interface" should read --interfere--.

Signed and Sealed this

Eleventh Day of October, 1994

Attest:

BRUCE LEHMAN

*Attesting Officer*     *Commissioner of Patents and Trademarks*